Jan. 20, 1931.  J. P. WALKER  1,789,612
AUTOMATIC OIL SEPARATOR
Filed Nov. 21, 1927   2 Sheets-Sheet 1
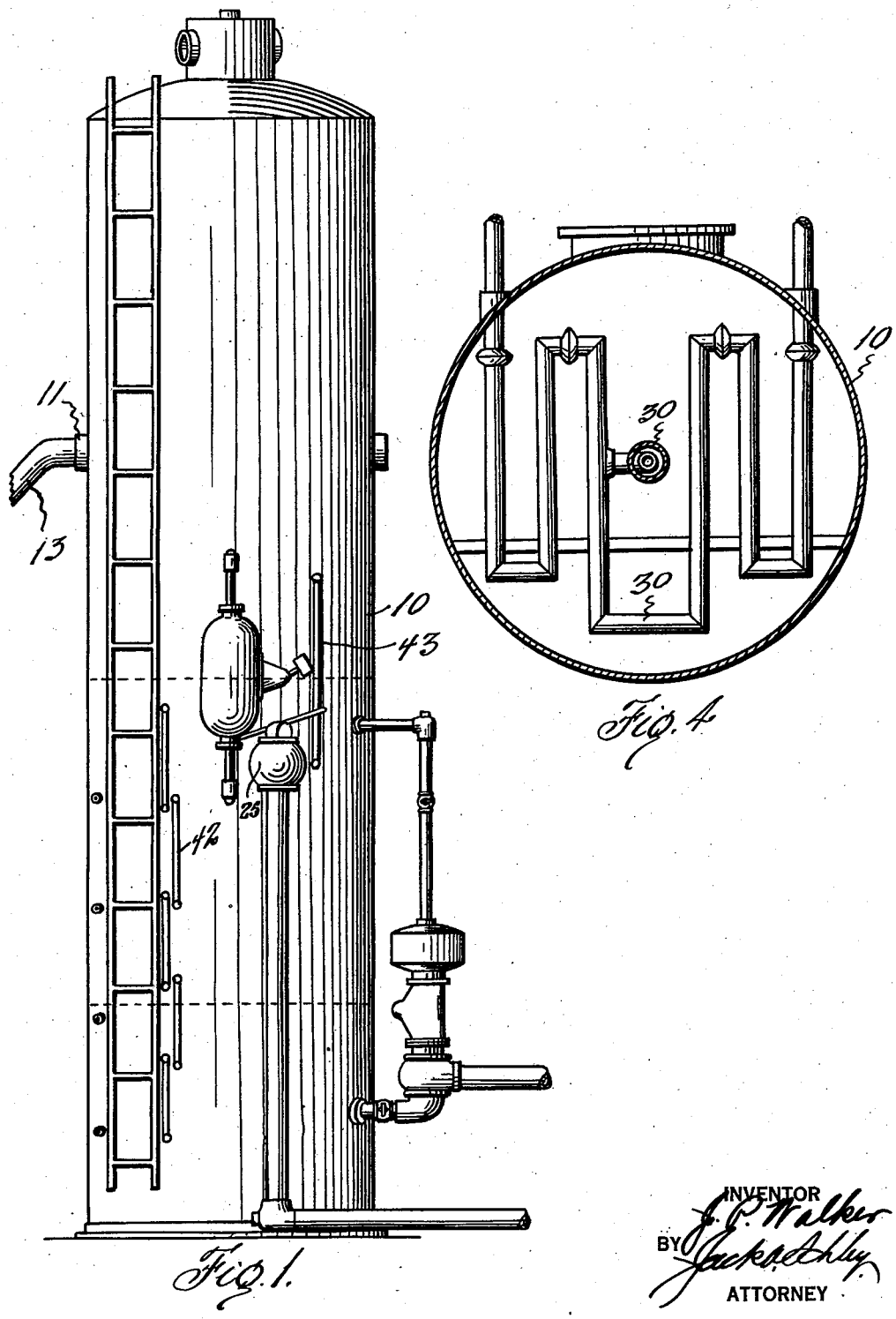

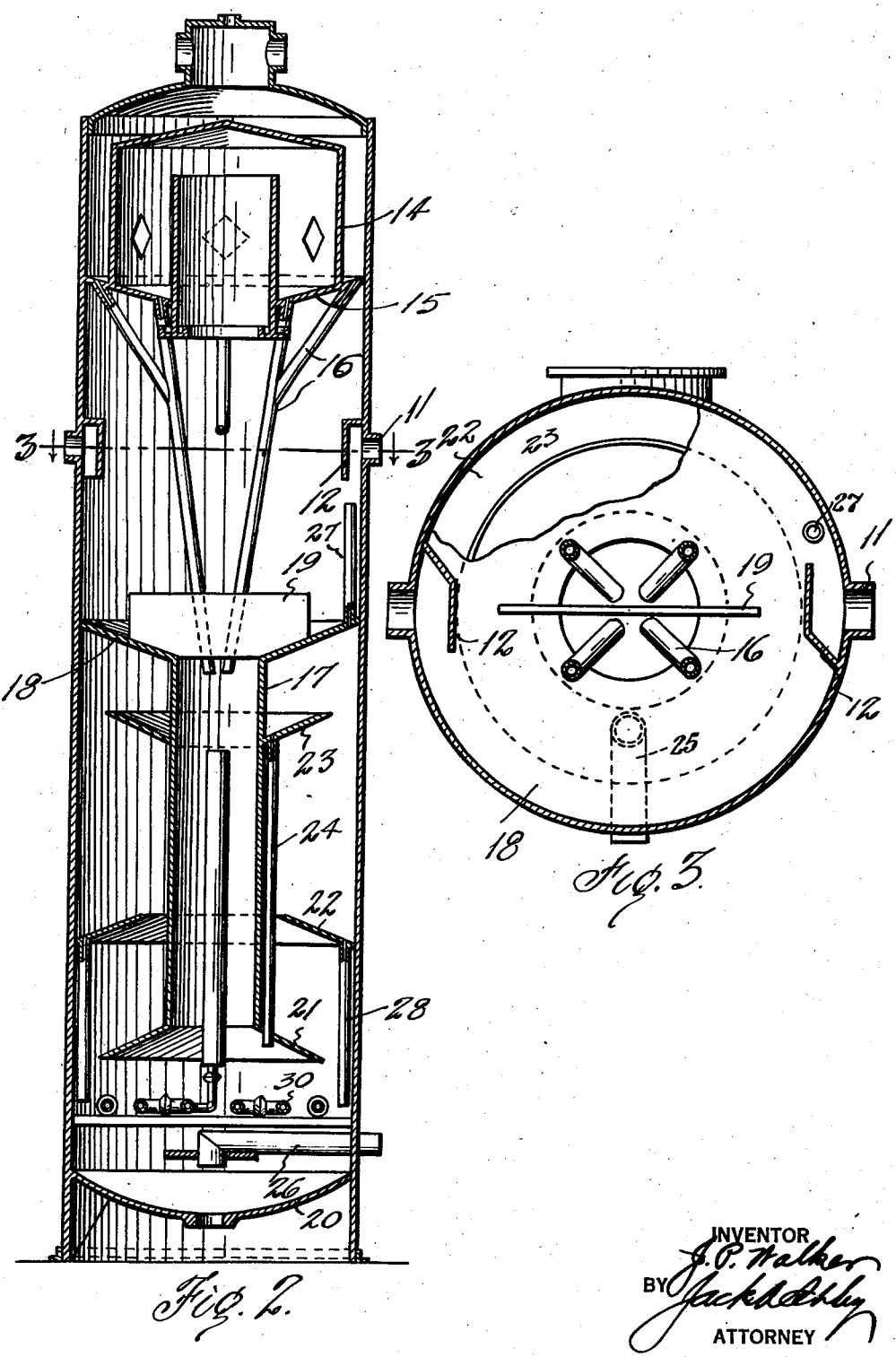

Patented Jan. 20, 1931

1,789,612

UNITED STATES PATENT OFFICE

JAY P. WALKER, OF TULSA, OKLAHOMA, ASSIGNOR OF FORTY PER CENT TO GUY O. MARCHANT AND SIX PER CENT TO C. G. WELLS, BOTH OF TULSA, OKLAHOMA

AUTOMATIC OIL SEPARATOR

Application filed November 21, 1927. Serial No. 234,730.

This invention relates to an automatic oil separator and particularly to a construction of tank adapted to separate the gas and water from stock oil in its flow therethrough.

The stock oil as delivered from a well contains a mixture of gas, salt water and sand and any splashing or agitation thereof tends to cut or emulsify the oil which renders the separation of water therefrom difficult. For this purpose steam heated settling tanks are usually necessary and also a chemical treatment of the stock oil, and such methods involve a great loss of time and incur material expense. In actual practice the pipe line companies require that the stock oil have a very low percentage of water, either free or in emulsion, owing to its effect upon storage tank constructions. It therefore becomes necessary to effectually remove such water and to reduce the chemicals used, if any, to a minimum.

The present invention avoids the objections stated and reduces the agitation of the stock oil to a minimum after it enters the separator through which its flow is suitably retarded to permit gravity separation of the sand and water therefrom, while the free gases are collected at the upper portion of the separator. The construction of the hopper and baffles prevents any whirling movement of the oil or violent agitation in its passage downward through the stack from which it is discharged beneath the hood. This hood retards an immediate upward flow and causes the oil to traverse a circuitous path about the lower and upper baffles until it reaches the outlet beneath the hopper The oil in flowing in contact with these baffles causes water to settle thereon which is conducted to the water outlet at the base of the separator. I thus effect a continuous automatic separation of the gas and water from the stock oil in its flow through a single separating tank.

The invention has for an object to provide a novel and improved construction of tank having a gas separator at its upper portion and a conduit feeding the stock oil to the base of the tank, with means to retard the upward movement of the oil and collect therefrom any water not otherwise separated from the oil by gravity.

Another object of the invention is to present a new construction of water separator including an inlet chamber having a hopper bottom and a feed stack depending therefrom, together with baffle plates intermediate the tank and stack to retard an upward flow of the liquid.

A further object of the invention is to provide a tank having a gas separator at its upper portion, a water chamber at its base, and an intermediate inlet chamber having a hopper bottom and stack depending therefrom, together with a plurality of baffles surrounding said stack and formed with pipes draining to the water chamber.

Other and further objects and advantages of the invention will be hereinafter set forth and the novel features thereof defined by the appended claims.

In the drawings—

Figure 1 is a side elevation of the separator;

Figure 2 is a vertical section thereof;

Figure 3 is a section on line 3—3 of Figure 2; and

Figure 4 is a detail plan of the heating coil.

Like numerals refer to like parts in the several figures of the drawings.

This construction of separator is adapted for a variety of applications, but is especially designed for use in the conservation system disclosed in my copending application Serial No. 234,731.

The numeral 10 designates a separating tank which may be of any desired size or configuration and is provided at a point above its midheight with inlets 11 for the crude or stock oil. These inlets are connected with a feed line 13 and protected within the tank by a boxing 12 open at its bottom and one end to cause a lateral downward flow of the entering oil. At the upper portion of the tank a gas separator 14 is located and the structure thereof forms the subject of an independent application. The trough 15 of this separator drains downward any liquid which may collect therein through the pipes 16 which discharge into the stack 17 depending from the hopper bottom 18 beneath the inlets. This hopper is formed with a baffle plate 19 to prevent any whirling movement of the stock oil which would tend to emulsify the water associated therewith. The hopper also forms an inlet to the chamber divided from the lower portion of the tank which comprises a water separator. As the oil will float upon the water it is obvious that water will collect on and above the bottom 20 and this portion of the tank forms a water chamber. The oil floating upon the water occupies a higher elevation in the tank and this portion of the tank forms the oil chamber. The oil level and the water level are indicated by dotted lines in Figure 1.

The stack 17 extends downward into this water separator and discharges above the bottom 20 of the tank. Its lower end is formed with a hood 21 which by retarding the upward flow permits the bulk of water to settle to the bottom of the tank, while the oil rises through the space between the baffle 22 carried by the tank and the stack. Any water which may be collected upon this baffle is drained back by the pipes 28 and the rising oil is outwardly deflected by the upper baffle 23 which is likewise provided with a return drain pipe 24. An outlet pipe 25 for the clean or dehydrated oil is located beneath the hopper and has an upwardly directed opening within the tank. The hopper is also provided with a gas vent 27 extending above the same to release any gas which may collect in the water separator. At the base of the tank a water outlet 26 is disposed with a downwardly directed inlet to feed from the water collected at the bottom of the tank.

Under some conditions of use it is desirable to heat the stock oil to facilitate the separation of water therefrom, and for this purpose a heating coil 30 may be supported beneath the hood at the feed from the stack and a vertical stand pipe 31 is provided within the stack for heating the upper portion of the oil feed. The tank is equipped from the water level upward with a series of gage glasses 42 and a similar glass 43 at the oil level. A clean-out manhole 44 may be provided adjacent the base of the tank.

The operation of the separator will be apparent from the foregoing description and it will be seen that the inflowing stock oil passes downward through the stack without agitation so as to effect a gravity separation of the water at the hood, and the upward flow of the oil is then retarded to permit the baffles to collect any remaining water and drain it to the base of the tank. Any oil vapor which may be condensed at the gas separator is returned to the stock for treatment, while gases collecting in the water separator are vented through the hopper for passage to the gas separator. The invention therefore secures in the use of a single tank means for the most efficient and rapid dehydration of the oil in its passage therethrough.

The specific details of construction of the separator have been shown and described but the invention is not confined thereto as changes and alterations may be made therein without departing from the spirit of the invention as recited in the following claims.

What I claim is:—

1. In an automatic oil separator, a tank having a gas separator at its upper portion and a feed chamber below the separator, a conduit leading from the feed chamber feeding stock oil to the base of the tank, a water chamber at said base, means to retard the upward movement of the oil and water between the conduit and tank and collect therefrom the water carried by the oil, and means for conducting such water to said chamber.

2. In an automatic oil separator, a tank having a feed chamber at its upper portion, a conduit depending from said chamber for feeding stock oil to the base of the tank, a water chamber at said base, impervious means between the conduit and tank for retarding the upward movement of the oil and water to a point of discharge beneath said feed chamber, and drain conductors extending downward from the retarding means to discharge into the water chamber.

3. In an automatic oil separator, a tank having a feed chamber at its upper portion, a conduit depending from said chamber, a gas separator above said chamber having a liquid drain into the conduit, a water separator beneath said chamber, and a gas vent from the water separator discharging into the feed chamber.

4. In an automatic oil separator, a tank having a feed chamber with an inlet opening, a housing at the inner face of said opening closed at the top and one end, a bottom for said chamber provided with a depending conduit, a baffle at said bottom disposed to prevent rotative movement of the oil, and water separating means beneath said bottom cooperating with said conduit.

5. In an automatic oil separator, a tank having an inlet chamber formed with a hopper bottom, a feed stack depending therefrom, oppositely projected baffle plates intermediate the tank and stack to retard an upward flow of the oil, and means for conducting liquid collected by said plates to the lower portion of the tank.

6. In an automatic oil separator, a tank having an inlet chamber formed with a hopper bottom, a feed stack depending therefrom, oppositely projected baffles intermediate the tank and stack, and drain pipes extending from said baffles to discharge at the base of the tank.

7. In an automatic oil separator, a tank having an inlet chamber with its bottom provided with a depending feed stack, a downwardly deflected hood at the lower end of said stack, baffles disposed between said hood and bottom and alternately secured to the stack and tank, means for conducting liquid from said baffles to the lower portion of the tank, and a clean oil outlet disposed between said bottom and the upper baffle.

8. In an automatic oil separator, a tank having an inlet chamber with its bottom provided with a depending feed stack, a downwardly deflected hood at the lower end of the stack, oppositely deflected baffles alternately secured to the stack and tank, drains from such baffles to the base of the tank, a water discharge at said base, and an oil outlet beneath said bottom.

9. In an automatic oil separator, a tank having an inlet chamber formed with a hopper bottom, a baffle extending transversely thereof, a feed stack depending from said bottom and having a downwardly deflected hood at its lower end, a baffle plate secured to the tank above and overlapping said hood, an upwardly deflected baffle plate secured to the stack and overlapping the first mentioned baffle plate, an oil outlet above the upwardly deflected baffle, and a water discharge beneath said hood.

10. In an automatic oil separator, a tank having an inlet chamber formed with a hopper bottom, a feed stack depending from said bottom and having a hood at its lower end, a pair of oppositely deflected baffles above said hood, an oil outlet above the upper baffle, a water discharge beneath the hood, and a gas separator at the upper portion of the tank having a liquid collecting trough and a drain therefrom to said feed stack.

11. In an automatic oil separator, a tank having an inlet chamber, a conduit depending therefrom and provided at its lower end with a lateral hood, means extending transversely between the conduit and tank for retarding the upward movement of the oil to a point of discharge, a closed horizontal heating coil supported beneath the hood in the path of the flowing oil, and a closed stand pipe extending upward from said coil into said conduit.

12. In an automatic oil separator, an upright tank having an inlet chamber intermediate its ends and a water chamber at its bottom, a conduit leading from the inlet chamber to the water chamber for feeding stock oil to said water chamber, means for retarding the upward flow from the water chamber located exteriorly of the conduit, means for drawing off the water from the water chamber, means at a higher elevation for drawing off the oil from the tank between the water chamber and the feed chamber, a heating means located in the water chamber below the conduit and in the path of the stock oil which is discharged from the conduit into the water chamber, and oil and gas separating means in the tank above the feeding chamber.

In testimony whereof I affix my signature.

JAY P. WALKER.